United States Patent
Hayward

[11] 3,914,006
[45] Oct. 21, 1975

[54] METER SOCKET

[75] Inventor: Gary Hayward, Scarborough, Canada

[73] Assignee: Federal Pacific Electric Company, Newark, N.J.

[22] Filed: Jan. 25, 1974

[21] Appl. No.: 436,735

[52] U.S. Cl............................ 339/198 M; 339/219 F
[51] Int. Cl.²........................................... H01R 9/00
[58] Field of Search.......... 339/198 M, 31 B, 217 R, 339/219 R, 219 F, 125 R; 317/105–111

[56] References Cited
UNITED STATES PATENTS

| | | |
|---|---|---|
| 2,880,380 | 3/1959 | Schmidt et al.................. 339/31 B |
| 3,131,984 | 5/1964 | Kobryner........................ 339/31 B |
| 3,353,142 | 11/1967 | Spencer........................ 339/219 F |
| 3,394,340 | 7/1968 | Kobryner....................... 339/217 R |
| 3,530,340 | 9/1970 | Meacham........................ 317/106 |
| 3,662,323 | 5/1972 | Stanback....................... 339/217 R |
| 3,731,253 | 5/1973 | Coffey......................... 339/198 M |
| 3,735,332 | 5/1973 | Tirrell........................ 339/217 R |

Primary Examiner—Joseph H. McGlynn
Assistant Examiner—James W. Davie

[57] ABSTRACT

A meter socket includes plural clips for plug-in reception of the contacts of a watt-hour meter. Each clip is secured to a combined mounting and terminal member by a nut and bolt. The bolt additionally secures the terminal member against removal from the insulation plate of the meter socket. The terminal member besides mounting the clip on the base plate also serves as a connection for a line, load or ground wire.

10 Claims, 5 Drawing Figures

U.S. Patent  Oct. 21, 1975  3,914,006
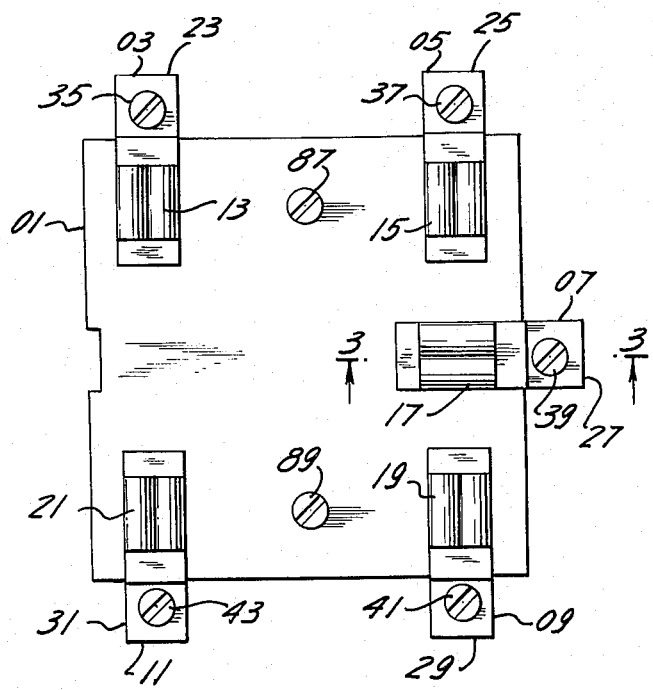
FIG. 1
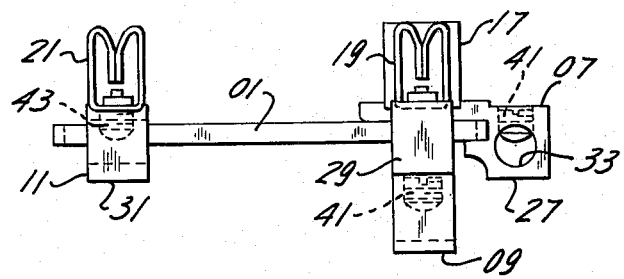
FIG. 2
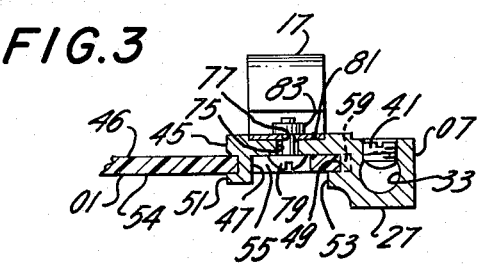
FIG. 3
FIG. 5
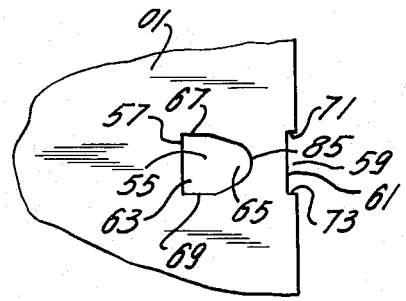
FIG. 4
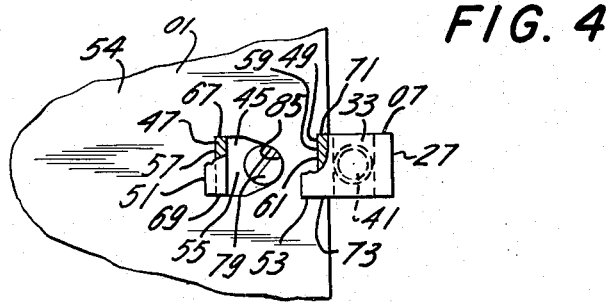

3,914,006

METER SOCKET

FIELD OF THE INVENTION

This invention relates to meter sockets and particularly the type that detachably receives the terminal blades of a plug-in type watt-hour meter.

BACKGROUND OF THE INVENTION

The customary meter socket has a pair of line terminals, a pair of load terminals and a ground terminal. Clips to receive the blades of the meter are mounted on the base plate of the meter socket. Terminals to connect the clips to the line, load and ground wires are required. In a typical construction, a screw has been used to secure a clip and a terminal together, the same screw extending through the insulating base of the meter socket. In such a system, the interposed insulation tends to yield and thereby tends to cause instability in the connection between the clip and the terminal.

SUMMARY OF THE INVENTION

Meter sockets of the present invention include a base plate of electrical insulation and a plurality of plug-in terminals for receiving the terminal blades of a meter. Each plug-in terminal, besides having a clip for receiving a meter blade, also has a combined mounting and terminal member which serves to mount the clip on the base plate and at the same time serves as a terminal for connecting a wire to the clip. The means by which the terminal member mounts the clip on the base plate also serves to resist twisting of the terminal member relative to the base plate. This mounting means includes a first or main portion for overlying one side of the base plate adjacent a first edge portion of the base, a second portion extending across the first edge portion and flanked by additional edge portions, a lip portion overlying the second side of the base plate adjacent the first edge portion, and a fastener. The fastener serves to fasten the clip to the terminal member, and when installed, is positioned to secure the terminal member to the base plate by restricting movement of the terminal member so that the lip portion is unable to clear the first edge portion.

The additional edge portions, which flank that portion of the terminal member extending across the first edge portion, are the means resisting the twisting of the terminal member relative to the base plate.

It is an object of the invention to provide a meter socket wherein the plug-in terminals are mounted on a base plate and resist twisting relative to the base plate.

It is another object of the invention to provide a meter socket wherein the plug-in terminals consist of a clip member and a combined mounting and terminal member, and wherein the means that fastens the clip to the terminal member also serves to secure the terminal member against removal from the baseboard without requiring the baseboard to be tightened to the clip and terminal.

BRIEF DESCRIPTION OF THE DRAWINGS

FIG. 1 shows a top view of a meter socket as an embodiment of my invention.

FIG. 2 shows an end view of the meter socket of FIG. 1

FIG. 3 shows in cross-section, along the line 3—3 in FIG. 1, a plug-in terminal secured to the base plate of FIG. 1

FIG. 4 shows partially in cross-section the bottom view of a plug-in terminal secured to the base plate of FIG. 1.

FIG. 5 shows how the base plate of FIGS. 1–4 is prepared so that it can receive a plug-in terminal of FIGS. 1–4.

DESCRIPTION OF THE PREFERRED EMBODIMENT

FIG. 1 shows a meter socket consisting of a base plate 01 in the form of a panel of insulation as of glass-reinforced polyester and five plug-in terminals 03, 05, 07, 09 and 11. Each of the plug-in terminals has a resilient metal clip or jaw 13, 15, 17, 19, 21 designed to receive the terminal blade of a meter (not shown) and a combination mounting and terminal member 23, 25, 27, 29, 31. Each of the terminal members is provided with a terminal aperture for receiving a connecting wire (not shown), as for example aperture 33 in member 27, shown in FIG. 2, and a terminal screw 35, 37, 39, 41, 43 for securing the wire in the aperture. For ease in inserting the wires into the apertures the terminal members can be of different shapes. As shown in FIG. 2 the height of terminal member 09 is greater than the height of terminal member 11, thus placing the wire receiving aperture of member 09 at a different height than that at which the aperture of member 11 is placed. Thus, the five plug-in terminals serve to connect the meter to the line side, the load side and the ground of the system.

Each plug-in terminal is designed to be secured in base plate 01 as shown in FIG. 3. Terminal 07, representative of all the terminals, is shown in cross-section in FIG. 3, and will be described in detail. Terminal member 07 includes a first or main portion 45 which overlies one side 46 of base plate 01, a pair of second portions 47 and 49 which extend along edge portions of the base plate, and a pair of lip portions 51 and 53 which overlie the second side 54 of base plate 01. Terminal member 07 is a metal extrusion whose cross-section is shown in FIG. 3. A long extrusion of this shape is cut transversely into many such terminals and is thus a low-cost part.

As shown in FIG. 4, an aperture 55 is provided in base plate 01 and portion 47 extends along the edge 57 of aperture 55 while lip portion 51 overlies the second side 54 of base plate 01 adjacent edge 57. In addition, a notch 59 is provided in base plate 01, and portion 49 extends along the edge 61 of notch 59 while lip portion 53 overlies the second side 54 of base plate 01 adjacent edge 61.

FIG. 5 shows a view of base plate 01 with terminal member 27 removed. The aperture 55 and the notch 59 are clearly shown. The depth of rectangular portion 63 is sufficient to admit lip portion 51 and portion 47. The curved portion 65 of aperture 55 is spaced from edge 57 only by a distance sufficient to admit the head of a fastener screw to be described below. The edges 67 and 69 of aperture 55, and the edges 71 and 73 of the notch 59, where they flank portions 47 and 49 respectively, serve to restrict twisting movement of terminal member 27 relative to base plate 01.

With terminal member 27 mounted on base plate 01, clip 17 is secured to member 27 as shown in FIG. 3.

Terminal member 27 and clip 17 both have clearance holes 75 and 77 respectively, sufficiently large to admit the shank of screw or bolt 79. Clip 17 is placed in channel 81 in member 27. Clearance holes 75 and 77 are aligned, and bolt 79 is inserted and tightened to nut 83. The clip 17 and terminal member 27 are now securely fastened together by the nut and bolt. The head of bolt 79 is disposed in the curved portion 65 of aperture 55 along edge 85 in such a position that the terminal member 27 is prevented from moving sufficiently for lip 51 to clear edge 57 or for lip 53 to clear edge 59. Thus nut and bolt, 83 and 79 act to secure the clip 17 to the terminal member 27, and in addition, they secure the terminal member 27 to the base plate 01. However, base plate 01 is not interposed between the head of bolt 79 and nut 83, so that there is no problem of the connection between clip 17 and terminal 27 becoming loose due to slight yielding of the insulation.

Base plate 01 can then be secured to the system by means of screws 87 and 89.

It will be understood that modifications of the illustrated preferred embodiment are considered to be within the scope of the invention. For example, while two lip portions 51 and 53 are of distinct advantage, either one of the lip portions 51 and 53 could be eliminated and the terminal member would still be secured to the base plate. This and other such modifications are considered to be within the scope of the invention.

What is claimed is:

1. A meter socket including a base plate of electrical insulation having first and second sides, first and second edge portions spaced apart from each other in a direction parallel to said first side and a plurality of plug-in terminals for receiving terminal blades of a meter, at least certain of said plug-in terminals having a meter-blade-receiving clip member, a combined mounting and terminal member and a fastener, said combined mounting and terminal member including terminal means for fastening a wire thereto, a first portion overlying said first side of said base plate adjacent said first edge portion thereof and said first portion bearing said clip member, a second portion extending across and closely adjacent to said first edge portion and a lip portion overlying said second side of said base plate adjacent said first edge portion, said combined mounting and terminal member being movable as a unit in the absence of said fastener into a released position wherein said lip portion clears said first edge portion and said terminal member is released from said base plate, said fastener having a portion extending from said first portion of said terminal member into position closely adjacent said second edge portion of said base plate when said second portion of said terminal member is closely adjacent to said first edge portion for preventing movement of said terminal member into said released position, said fastener additionally securing said clip member to said combined mounting and terminal member.

2. A meter socket as claimed in claim 1, wherein said second portion of each of the combined mounting and terminal members is flanked by additional edge portions of the base plate and wherein said additional edge portions flanking said second portion are positioned for restricting twisting movement of said combined mounting and terminal member relative to said base plate.

3. A meter socket including a base plate of electrical insulation having first and second sides and being formed to define an aperture, and a plurality of plug-in terminals for receiving terminal blades of a meter, each of said plug-in terminals having a blade-receiving clip member, a combined mounting and terminal member bearing said blade-receiving clip member and including a first portion overlying said first side of said base plate adjacent said aperture, a second portion having a laterally extending lip, and a fastener, said aperture having first and second mutually opposite edge portions spaced apart in a direction parallel to said first side of the base plate and being sufficiently large to receive said second portion of the terminal member and said laterally extending lip, said second portion extending through said aperture closely adjacent said first edge portion of said aperture, said lip overlying said second side of said base plate adjacent said first edge portion of said aperture, said combined mounting and terminal member being movable laterally as a unit in the absence of said fastener into released position wherein said lip clears said first edge portion of said aperture for enabling said member to be assembled to and removed from said base plate, said fastener having a portion extending from said first portion of the terminal member into position within said aperture and closely adjacent said second portion of said aperture when a said fastener portion is disposed closely adjacent said second edge portion for restricting lateral movement of said terminal member into said released position, said fastener additionally securing said clip member to said mounting member.

4. A meter socket as claimed in claim 3, wherein said base plate is formed to include a notch along the periphery thereof at each of said plug-in terminals, each notch providing a third edge portion of the base plate, and wherein each said combined mounting and terminal member includes a third portion having a second lip overlying said second side of said base plate adjacent the related third edge portion of the base plate.

5. A meter socket as claimed in claim 4, including edge portions of the base plate flanking those portions of the terminal member adjacent said first and third edge portions, said flanking edge portions being positioned for restricting twisting movement of said terminal member relative to said base plate.

6. A meter socket including a base plate of electric insulation having first and second sides, a plurality of edge portions and at least one plug-in terminal, said plug-in terminal having a clip member for receiving a terminal blade of a meter, a fastener, and a combined mounting and terminal member including a terminal means for receiving and securing a wire, a first portion overlying said first side of said base plate and lip means overlying said second side of said base plate adjacent at least one of said plurality of edge portions, said lip means and said first portion being connected by connection means extending across and closely adjacent to one of said edge portions, said combined mounting and terminal member being movable laterally as a unit in the absence of said fastener to a released position wherein said lip means clears said one of said edge portions, said fastener having a portion extending from said first portion into position closely adjacent another of said edge portions spaced from said first edge portion in a direction parallel to the first side of said base plate and arranged to restrict lateral movement of said combined mounting and terminal member to said released position, said fastener additionally securing said clip member to said combined mounting and terminal member.

7. A meter socket as claimed in claim 6, wherein said connection means is flanked by opposing surfaces of edge portions of the base plate in position for restricing twisting movement of said combined mounting and terminal member relative to said base plate.

8. A meter socket as claimed in claim 6, wherein said base plate is formed to define an aperture having an edge portion and wherein said lip means overlies said second side adjacent said edge portion of said aperture.

9. A meter socket as claimed in claim 6, wherein said base plate is formed to define at least a notch along its periphery at said plug-in terminal and wherein said lip means overlies said second side of the base plate adjacent an edge portion of said notch.

10. A meter socket as claimed in claim 6, wherein said base plate is formed to define a notch along its periphery at said plug-in terminal and to define an aperture in the base plate and wherein said lip means includes lips adjacent edge portions of said notch and of said aperture, respectively.

* * * * *